US012712688B2

(12) United States Patent
Wang et al.

(10) Patent No.: US 12,712,688 B2
(45) Date of Patent: Aug. 18, 2026

(54) INFORMATION INDICATION METHOD, INFORMATION OBTAINING METHOD AND DEVICES

(71) Applicant: DATANG MOBILE COMMUNICATIONS EQUIPMENT CO., LTD., Beijing (CN)

(72) Inventors: Jiaqing Wang, Beijing (CN); Yuwan Su, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 356 days.

(21) Appl. No.: 18/560,095

(22) PCT Filed: Apr. 27, 2022

(86) PCT No.: PCT/CN2022/089512
§ 371 (c)(1),
(2) Date: Nov. 9, 2023

(87) PCT Pub. No.: WO2022/237540
PCT Pub. Date: Nov. 17, 2022

(65) Prior Publication Data

US 2024/0243869 A1 Jul. 18, 2024

(30) Foreign Application Priority Data

May 11, 2021 (CN) ......................... 202110513687.9

(51) Int. Cl.
*H04L 5/00* (2006.01)

(52) U.S. Cl.
CPC .................................. *H04L 5/0048* (2013.01)

(58) Field of Classification Search
CPC ... H04L 5/0048; H04L 5/0094; H04L 5/0053; H04W 52/0209; H04W 52/0212;
(Continued)

(56) References Cited

U.S. PATENT DOCUMENTS 11,910,463 B2 * 2/2024 Hwang .............. H04W 72/232
2020/0022170 A1 1/2020 Ji et al.
(Continued)

FOREIGN PATENT DOCUMENTS

CN 109586874 A 4/2019
CN 110072285 A 7/2019
(Continued)

OTHER PUBLICATIONS

International Search Report for International Patent Application No. PCT/CN2022/089512 issued by WIPO on Jul. 27, 2022 and its English translation provided by WIPO.
Written Opinion for International Patent Application No. PCT/CN2022/089512 issued by WIPO on Jul. 27, 2022 and its English translation provided by WIPO.
International Preliminary Report on Patentability for International Patent Application No. PCT/CN2022/089512 issued by WIPO on Nov. 14, 2023 and its English translation provided by WIPO.
(Continued)

*Primary Examiner* — Frank Duong
(74) *Attorney, Agent, or Firm* — Ladas & Parry, LLP

(57) ABSTRACT

The present disclosure provides an information indication method and device, an information obtaining method and device. The information indication method includes: configuring, by a network side device, a first transmission resource, the first transmission resource being a transmission resource corresponding to an RS; and transmitting, by the network side device, first signaling, the first signaling being used to indicate resource information on the first transmission resource, the first signaling including at least one of high-layer signaling or layer1 signaling, and the resource information including at least one of whether there is the RS, or whether there is an update to the RS.

18 Claims, 2 Drawing Sheets

(58) Field of Classification Search
CPC ......... H04W 52/0216; H04W 52/0229; H04W 68/025; Y02D 30/70
See application file for complete search history.

(56) References Cited

U.S. PATENT DOCUMENTS

| | | | | |
|---|---|---|---|---|
| 2020/0259603 | A1 | 8/2020 | Dong et al. | |
| 2020/0275408 | A1 | 8/2020 | Radulescu et al. | |
| 2021/0068074 | A1 | 3/2021 | He et al. | |
| 2021/0105739 | A1 | 4/2021 | Lin et al. | |
| 2021/0378000 | A1 | 12/2021 | Zhang et al. | |
| 2022/0303089 | A1* | 9/2022 | Liao | H04L 5/0091 |
| 2023/0078444 | A1* | 3/2023 | Maleki | H04L 5/0094 370/311 |
| 2024/0073836 | A1* | 2/2024 | Liu | H04W 56/001 |
| 2024/0163049 | A1* | 5/2024 | Nagano | H04L 5/005 |
| 2024/0187988 | A1* | 6/2024 | Maleki | H04W 52/0216 |
| 2024/0244593 | A1* | 7/2024 | Jan | H04L 5/0094 |
| 2024/0244701 | A1* | 7/2024 | Li | H04W 76/28 |
| 2025/0175293 | A1* | 5/2025 | Li | H04L 5/0048 |

FOREIGN PATENT DOCUMENTS

| | | | |
|---|---|---|---|
| CN | 111585724 | A | 8/2020 |
| WO | 2018170896 | A1 | 9/2018 |

OTHER PUBLICATIONS

"Remaining Issues on UL Positioning Reference Signal" 3GPP TSG RAN WG1 #100, R1-2000463, e-Meeting, Feb. 24-Mar. 6, 2020, Source: OPPO, Agenda Item: 7.2.8.2.

First Chinese Office Action and search report for Chinese Patent Application No. 202110513687.9 issued by the Chinese Patent Office on Jul. 13, 2023 and its English translation provided by the foreign associate.

"Evaluation methodology and paging enhancements for idle/inactive mode UE power saving," 3GPP TSG RAN WG1 #102-e R1-2005615, e-Meeting, Aug. 17-28, 2020, Agenda Item: 8.7.1.1, Source: MediaTek Inc.

"TRS/CSI-RS for idle/inactive UEs," 3GPP TSG RAN WG1 #102 R1-2006158, e-Meeting, Aug. 17-Jun. 28, 2020, Agenda Item: 8.7.1.2, Source: Samsung.

Extended European Search Report issued on Oct. 10, 2024 for European Patent Application No. 22806509.0.

Huawei et al.; "Assistance RS occasions for Idle/inactive mode"; 3GPP TSG RAN WG1 Meeting #104e, R1-2100217; e-meeting, Jan. 25-Feb. 5, 2021.

Xiaomi Communications; "Summary of [041] [ePoWSav] TRS/CSI-RS for Idle Inactive"; 3GPP TSG RAN WG2 Meeting # 113 electronic; R1-2102387; Jan. 25-Feb. 5, 2021.

* cited by examiner

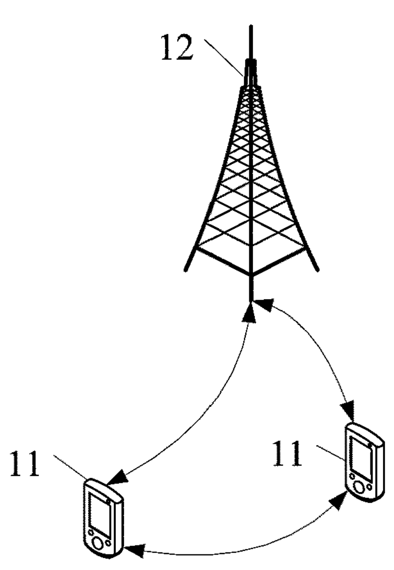

FIG. 1 configuring, by a network side device, a first transmission resource, the first transmission resource being a transmission resource corresponding to an RS (201)

transmitting, by the network side device, first signaling, the first signaling being used to indicate resource information on the first transmission resource, the first signaling including at least one of high-layer signaling or layer1 signaling, and the resource information including at least one of whether there is the RS, or whether there is an update to the RS (202)

FIG. 2 obtaining, by a UE, first signaling, the first signaling being used to indicate resource information on a first transmission resource, the first transmission resource being a transmission resource corresponding to an RS, the first signaling including at least one of high-layer signaling or layer1 signaling, and the resource information including at least one of whether there is the RS, or whether there is an update to the RS (301)

FIG. 3

INFORMATION INDICATION METHOD, INFORMATION OBTAINING METHOD AND DEVICES

CROSS-REFERENCE TO RELATED APPLICATIONS

This application is the U.S. national phase of PCT Application No. PCT/CN2022/089512 filed on Apr. 27, 2022, which claims priority to the Chinese patent application No. 202110513687.9 filed on May 11, 2021, the disclosures of which are incorporated herein by reference in their entireties.

TECHNICAL FIELD

The present disclosure relates to the field of communication technology, in particular to an information indication method, an information obtaining method and devices.

BACKGROUND

After the transmission for a User Equipment (UE) in a connected state has been completed, the transmission of a Channel State Information Reference Signal (CSI-RS) or Tracking Reference Signal (TRS) configured by a base station for the UE in the connected state is probably deactivated rapidly, so a Reference Signal (RS) is not necessarily transmitted on an RS resource configured by the base station for a UE in an idle state. For the UE in the idle state or an inactive state, it is impossible to accurately determine whether there is the RS on the RS resource, leading to an increase in the quantity of blind detection operations of the UE, and thereby an increase in the power consumption of the UE in the idle state or inactive state.

SUMMARY

An object of the present disclosure is to provide an information indication method, an information obtaining method, and devices, so as to solve the problem in the related art where the power consumption of the UE in the idle state or inactive state increases because it is difficult for the UE to accurately determine whether there is the RS on the RS resource.

In one aspect, the present disclosure provides in some embodiments an information indication method, including: configuring, by a network side device, a first transmission resource, the first transmission resource being a transmission resource corresponding to an RS; and transmitting, by the network side device, first signaling, the first signaling being used to indicate resource information on the first transmission resource, the first signaling including at least one of high-layer signaling or layer1 signaling, and the resource information including at least one of whether there is the RS, or whether there is an update to the RS.

In some possible embodiments of the present disclosure, the information indication method further includes explicitly or implicitly indicating, by the network side device, a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of a Master Information Block (MIB), a System Information Block (SIB1), or an SIB for configuring the first transmission resource.

In some possible embodiments of the present disclosure, the explicitly or implicitly indicating, by the network side device, the signaling type of the first signaling includes transmitting, by the network side device, first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging Downlink Control Information (DCI) in layer1 signaling; or in the case that the first indication information is fourth predetermined information, the first indication information is used to indicate that the signaling type of the first signaling is Paging Early Indication (PEI) in layer1 signaling; or in the case that the first indication information is fifth predetermined information, the first indication information is used to indicate that the signaling type of the first signaling is high-layer signaling.

In some possible embodiments of the present disclosure, the implicitly indicating, by the network side device, the signaling type of the first signaling through the indication information includes: in the case that first parameter information is carried in an SIB, indicating that the signaling type of the first signaling is layer1 signaling, otherwise indicating that the signaling type of the first signaling is high-layer signaling; or in the case that the first parameter information carried in the SIB is greater than or equal to a predetermined threshold, indicating that the signaling type of the first signaling is high-layer signaling, otherwise indicating that the signaling type of the first signaling is layer1 signaling.

In some possible embodiments of the present disclosure, the first signaling is high-layer signaling, and the information indication method further includes configuring a search space corresponding to a first SIB and a monitoring cycle for the search space through SI, the monitoring cycle includes an actual monitoring cycle, and the first SIB is an SIB other than SIB1.

In some possible embodiments of the present disclosure, the configuring the monitoring cycle for the search space through the SI includes configuring the actual monitoring cycle through the first SIB.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the information indication method further includes configuring, by the network side device, a maximum quantity of updates for the SIB through high-layer signaling.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the PEI is used to indicate resource information on the first transmission resource within a first cycle, the first cycle is a cycle within which the PEI has been configured, the paging DCI is used to indicate resource information on the first transmission resource within a second cycle, and the second cycle is a cycle within which no PEI has been configured yet.

In some possible embodiments of the present disclosure, the first signaling includes PEI and paging DCI, the PEI is used to indicate resource information on the first transmission resource within a first discontinuous reception (DRX) cycle, the paging DCI is used to indicate resource information on the first transmission resource within a second DRX cycle, and the first DRX cycle is located before the second DRX cycle.

In some possible embodiments of the present disclosure, the first signaling is layer1 signaling, the layer1 signaling includes PEI and paging DCI, the PEI is used to indicate first resource information on the first transmission resource, the paging DCI is used to indicate second resource information on the first transmission resource, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

In some possible embodiments of the present disclosure, the first signaling is layer1 signaling, and the transmitting, by the network side device, the first signaling includes transmitting, by the network side device, the first signaling in the case that there is paging information or a short message.

In some possible embodiments of the present disclosure, the information indication method further includes not indicating, by the network side device, that there is the RS on the first transmission resource through layer1 signaling any more in the case that the network side device has indicated through layer1 signaling that there is no RS on the first transmission resource and the SIB has not been updated.

In another aspect, the present disclosure provides in some embodiments an information obtaining method, including obtaining, by a UE, first signaling, the first signaling being used to indicate resource information on a first transmission resource, the first transmission resource being a transmission resource corresponding to an RS, the first signaling including at least one of high-layer signaling or layer1 signaling, and the resource information including at least one of whether there is the RS, or whether there is an update to the RS.

In some possible embodiments of the present disclosure, the information obtaining method further includes explicitly or implicitly obtaining, by the UE, a signaling type of the first signaling through indication information, the indication information is carried through high-layer signaling, and the signaling type includes at least one of high-layer signaling or layer signaling.

In some possible embodiments of the present disclosure, the high-layer signaling is system information, and the system information includes at least one of an MIB, an SIB1, or an SIB for configuring the first transmission resource.

In some possible embodiments of the present disclosure, the explicitly obtaining, by the UE, the signaling type of the first signaling through the indication information includes obtaining, by the UE, first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, the implicitly obtaining, by the UE, the signaling type of the first signaling through the indication information includes: in the case that first parameter information is carried in an SIB, determining that the signaling type of the first signaling is layer1 signaling, otherwise determining that the signaling type of the first signaling is high-layer signaling; or in the case that the first parameter information carried in the SIB is greater than or equal to a predetermined threshold, determining that the signaling type of the first signaling is high-layer signaling, otherwise determining that the signaling type of the first signaling is layer1 signaling.

In some possible embodiments of the present disclosure, the first signaling is high-layer signaling, the information obtaining method further includes obtaining a search space corresponding to a first SIB and a monitoring cycle for the search space through SI, the monitoring cycle includes an actual monitoring cycle, and the first SIB is an SIB other than SIB1.

In some possible embodiments of the present disclosure, the obtaining the monitoring cycle for the search space through the SI includes obtaining the actual monitoring cycle through the first SIB.

In some possible embodiments of the present disclosure, the information obtaining method further includes monitoring the search space corresponding to the first SIB in accordance with the actual monitoring cycle in the case that the updating of the SI is not triggered.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the information obtaining method further includes obtaining, by the UE, a maximum quantity of updates for the SIB through high-layer signaling.

In some possible embodiments of the present disclosure, the information obtaining method further includes updating the SIB or deactivating the SIB in accordance with the layer1 signaling within a current SI updating cycle.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the information obtaining method further includes determining, by the UE, resource information on the first transmission resource within a first cycle in accordance with the PEI and determining resource information on the first transmission resource within a second cycle in accordance with the paging DCI, the first cycle is a cycle within which the PEI has been configured, and the second cycle is a cycle within which no PEI has been configured yet.

In some possible embodiments of the present disclosure, the first signaling includes PEI and paging DCI, the information obtaining method further includes determining, by the UE, resource information on the first transmission resource within a first DRX cycle in accordance with the PEI and determining resource information on the first transmission resource within a second DRX cycle in accordance with the paging DCI, and the first DRX cycle is located before the second DRX cycle.

In some possible embodiments of the present disclosure, the first signaling is layer1 signaling, the layer1 signaling includes PEI and paging DCI, the information obtaining method further includes determining first resource information on the first transmission resource in accordance with the PEI and determining second resource information on the first transmission resource in accordance with the paging DCI, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

In yet another aspect, the present disclosure provides in some embodiments an information indication device, including a memory, a transceiver and a processor. The memory is configured to store therein a computer program, and the transceiver is configured to transmit and receive data under the control of the processor. The processor is configured to read the computer program in the memory so as to: configure a first transmission resource, the first transmission resource being a transmission resource corresponding to an RS; and transmit first signaling through the transceiver, the first signaling being used to indicate resource information on the first transmission resource, the first signaling including at least one of high-layer signaling or layer1 signaling, and the resource information including at least one of whether there is the RS, or whether there is an update to the RS.

In some possible embodiments of the present disclosure, the processor is further configured to explicitly or implicitly indicate a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of an MIB, an SIB1, or an SIB for configuring the first transmission resource.

In some possible embodiments of the present disclosure, when explicitly or implicitly indicating the signaling type of the first signaling, the processor is configured to transmit first indication information through the transceiver, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, when implicitly indicating the signaling type of the first signaling through the indication information, the processor is configured to: in the case that first parameter information is carried in an SIB, indicate that the signaling type of the first signaling is layer1 signaling, otherwise indicate that the signaling type of the first signaling is high-layer signaling; or in the case that the first parameter information carried in the SIB is greater than or equal to a predetermined threshold, indicate that the signaling type of the first signaling is high-layer signaling, otherwise indicate that the signaling type of the first signaling is layer1 signaling.

In some possible embodiments of the present disclosure, the first signaling is high-layer signaling, and the processor is further configured to configure a search space corresponding to a first SIB and a monitoring cycle for the search space through SI, the monitoring cycle includes an actual monitoring cycle, and the first SIB is an SIB other than SIB1.

In some possible embodiments of the present disclosure, when configuring the monitoring cycle for the search space through the SI, the processor is configured to configure the actual monitoring cycle through the first SIB.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the processor is further configured to configure a maximum quantity of updates for the SIB through high-layer signaling.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the PEI is used to indicate resource information on the first transmission resource within a first cycle, the first cycle is a cycle within which the PEI has been configured, the paging DCI is used to indicate resource information on the first transmission resource within a second cycle, and the second cycle is a cycle within which no PEI has been configured yet.

In some possible embodiments of the present disclosure, the first signaling includes PEI and paging DCI, the PEI is used to indicate resource information on the first transmission resource within a first DRX cycle, the paging DCI is used to indicate resource information on the first transmission resource within a second DRX cycle, and the first DRX cycle is located before the second DRX cycle.

In some possible embodiments of the present disclosure, the first signaling is layer1 signaling, the layer1 signaling includes PEI and paging DCI, the PEI is used to indicate first resource information on the first transmission resource, the paging DCI is used to indicate second resource information on the first transmission resource, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

In some possible embodiments of the present disclosure, the first signaling is layer1 signaling, and when transmitting the first signaling, the processor is configured to transmit the first signaling in the case that there is paging information or a short message.

In some possible embodiments of the present disclosure, the processor is further configured to not indicate that there is the RS on the first transmission resource through layer1 signaling any more in the case that a network side device has indicated through layer1 signaling that there is no RS on the first transmission resource and the SIB has not been updated.

In still yet another aspect, the present disclosure provides in some embodiments an information obtaining device, including a memory, a transceiver and a processor. The memory is configured to store therein a computer program, and the transceiver is configured to transmit and receive data under the control of the processor. The processor is configured to read the computer program in the memory so as to obtain first signaling through the transceiver, the first signaling is used to indicate resource information on a first transmission resource, the first transmission resource is a transmission resource corresponding to an RS, the first signaling includes at least one of high-layer signaling or layer1 signaling, and the resource information includes at least one of whether there is the RS, or whether there is an update to the RS.

In some possible embodiments of the present disclosure, the processor is further configured to explicitly or implicitly obtain a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of an MIB, an SIB1, or an SIB for configuring the first transmission resource.

In some possible embodiments of the present disclosure, when explicitly obtaining the signaling type of the first signaling through the indication information, the processor is configured to obtain first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, when implicitly obtaining the signaling type of the first signaling through the indication information, the processor is configured to: in the case that first parameter information is carried in an SIB, determine that the signaling type of the first signaling is layer1 signaling, otherwise determine that the signaling type of the first signaling is high-layer signaling; or in the case that the first parameter information carried in the SIB is greater than or equal to a predetermined threshold, determine that the signaling type of the first signaling is high-layer signaling, otherwise determine that the signaling type of the first signaling is layer1 signaling.

In some possible embodiments of the present disclosure, the first signaling is high-layer signaling, the processor is further configured to obtain a search space corresponding to a first SIB and a monitoring cycle for the search space through SI, the monitoring cycle includes an actual monitoring cycle, and the first SIB is an SIB other than SIB1.

In some possible embodiments of the present disclosure, when obtaining the monitoring cycle for the search space through the SI, the processor is configured to obtain the actual monitoring cycle through the first SIB.

In some possible embodiments of the present disclosure, the processor is further configured to monitor the search space corresponding to the first SIB in accordance with the actual monitoring cycle in the case that the updating of the SI is not triggered.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the processor is further configured to obtain a maximum quantity of updates for the SIB through high-layer signaling.

In some possible embodiments of the present disclosure, the processor is further configured to update the SIB or deactivate the SIB in accordance with the layer1 signaling within a current SI updating cycle.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the processor is further configured to determine resource information on the first transmission resource within a first cycle in accordance with the PEI and determine resource information on the first transmission resource within a second cycle in accordance with the paging DCI, the first cycle is a cycle within which the PEI has been configured, and the second cycle is a cycle within which no PEI has been configured yet.

In some possible embodiments of the present disclosure, the first signaling includes PEI and paging DCI, the processor is further configured to determine resource information on the first transmission resource within a first DRX cycle in accordance with the PEI and determine resource information on the first transmission resource within a second DRX cycle in accordance with the paging DCI, and the first DRX cycle is located before the second DRX cycle.

In some possible embodiments of the present disclosure, the first signaling is layer1 signaling, the layer1 signaling includes PEI and paging DCI, the processor is further configured to determine first resource information on the first transmission resource in accordance with the PEI and determine second resource information on the second transmission resource in accordance with the paging DCI, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

In still yet another aspect, the present disclosure provides in some embodiments an information indication device, including: a first configuration unit configured to configure a first transmission resource, the first transmission resource being a transmission resource corresponding to an RS; and a transmission unit configured to transmit first signaling, the first signaling being used to indicate resource information on the first transmission resource, the first signaling including at least one of high-layer signaling or layer1 signaling, and the resource information including at least one of whether there is the RS, or whether there is an update to the RS.

In some possible embodiments of the present disclosure, the information indication device further includes a first indication unit configured to explicitly or implicitly indicate a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of an MIB, an SIB1, or an SIB for configuring the first transmission resource.

In some possible embodiments of the present disclosure, the first indication unit is configured to transmit first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, the first indication unit is configured to: in the case that first parameter information is carried in an SIB, indicate that the signaling type of the first signaling is layer1 signaling, otherwise indicate that the signaling type of the first signaling is high-layer signaling; or in the case that the first parameter information carried in the SIB is greater than or equal to a predetermined threshold, indicate that the signaling type of the first signaling is high-layer signaling, otherwise indicate that the signaling type of the first signaling is layer1 signaling.

In some possible embodiments of the present disclosure, the first signaling is high-layer signaling, and the information indication device further includes a second configuration unit configured to configure a search space corresponding to a first SIB and a monitoring cycle for the search space through SI, the monitoring cycle includes an actual monitoring cycle, and the first SIB is an SIB other than SIB1.

In some possible embodiments of the present disclosure, the second configuration unit is configured to configure the actual monitoring cycle through the first SIB.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the information indication device further includes a third configuration unit configured to configure a maximum quantity of updates for the SIB through high-layer signaling.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the PEI is used to indicate resource information on the first transmission resource within a first cycle, the first cycle is a cycle within which the PEI has been configured, the paging DCI is used to indicate resource information on the first transmission resource within a second cycle, and the second cycle is a cycle within which no PEI has been configured yet.

In some possible embodiments of the present disclosure, the first signaling includes PEI and paging DCI, the PEI is used to indicate resource information on the first transmission resource within a first DRX cycle, the paging DCI is used to indicate resource information on the first transmission resource within a second DRX cycle, and the first DRX cycle is located before the second DRX cycle.

In some possible embodiments of the present disclosure, the first signaling is layer1 signaling, the layer1 signaling includes PEI and paging DCI, the PEI is used to indicate first resource information on the first transmission resource, the paging DCI is used to indicate second resource information on the first transmission resource, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

In some possible embodiments of the present disclosure, the first signaling is layer1 signaling, and the transmission unit is configured to transmit the first signaling in the case that there is paging information or a short message.

In some possible embodiments of the present disclosure, the information indication device further includes a first processing unit configured to not indicate that there is the RS on the first transmission resource through layer1 signaling any more in the case that a network side device has indicated through layer1 signaling that there is no RS on the first transmission resource and the SIB has not been updated.

In still yet another aspect, the present disclosure provides in some embodiments an information obtaining device, including a first obtaining unit configured to obtain first signaling, first signaling, the first signaling being used to indicate resource information on a first transmission resource, the first transmission resource being a transmission resource corresponding to an RS, the first signaling including at least one of high-layer signaling or layer1 signaling, and the resource information including at least one of whether there is the RS, or whether there is an update to the RS.

In some possible embodiments of the present disclosure, the information obtaining device further includes a second obtaining unit configured to explicitly or implicitly obtain a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of an MIB, an SIB1, or an SIB for configuring the first transmission resource.

In some possible embodiments of the present disclosure, the second obtaining unit is configured to obtain first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, the second obtaining unit is configured to: in the case that first parameter information is carried in an SIB, determine that the signaling type of the first signaling is layer1 signaling, otherwise determine that the signaling type of the first signaling is high-layer signaling; or in the case that the first parameter information carried in the SIB is greater than or equal to a predetermined threshold, determine that the signaling type of the first signaling is high-layer signaling, otherwise determine that the signaling type of the first signaling is layer1 signaling.

In some possible embodiments of the present disclosure, the first signaling is high-layer signaling, and the information obtaining device further includes a third obtaining unit configured to obtain a search space corresponding to a first SIB and a monitoring cycle for the search space through SI, the monitoring cycle includes an actual monitoring cycle, and the first SIB is an SIB other than SIB1.

In some possible embodiments of the present disclosure, the third obtaining unit is configured to obtain the actual monitoring cycle through the first SIB.

In some possible embodiments of the present disclosure, the information obtaining unit further includes a monitoring unit configured to monitor the search space corresponding to the first SIB in accordance with the actual monitoring cycle in the case that the updating of the SI is not triggered.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the information obtaining device further includes a fourth obtaining unit configured to obtain a maximum quantity of updates for the SIB through high-layer signaling.

In some possible embodiments of the present disclosure, the information obtaining device further includes a second processing unit configured to update the SIB or deactivate the SIB in accordance with the layer1 signaling within a current SI updating cycle.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the information obtaining device further includes a first determination unit configured to determine resource information on the first transmission resource within a first cycle in accordance with the PEI and determine resource information on the first transmission resource within a second cycle in accordance with the paging DCI, the first cycle is a cycle within which the PEI has been configured, and the second cycle is a cycle within which no PEI has been configured yet.

In some possible embodiments of the present disclosure, the first signaling includes PEI and paging DCI, the information obtaining device further includes a second determination unit configured to determine resource information on the first transmission resource within a first DRX cycle in accordance with the PEI and determine resource information on the first transmission resource within a second DRX cycle in accordance with the paging DCI, and the first DRX cycle is located before the second DRX cycle.

In some possible embodiments of the present disclosure, the first signaling is layer1 signaling, the layer1 signaling includes PEI and paging DCI, the information obtaining device further includes a third determination unit configured to determine first resource information on the first transmission resource in accordance with the PEI and determine second resource information on the second transmission resource in accordance with the paging DCI, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

In still yet another aspect, the present disclosure provides in some embodiments a processor-readable storage medium storing therein a program instruction. The program instruction is executed by a processor so as to implement the above-mentioned information indication method or information obtaining method. The present disclosure at least has the following beneficial effects.

According to the embodiments of the present disclosure, the network side device configures the transmission resource corresponding to the RS, and indicates the resource information on the first transmission resource through the first signaling, e.g., whether there is the RS and/or whether there is an update to the RS. As a result, it is able for a UE in an idle state or an inactive state to accurately obtain the resource information on the first transmission resource, and prevent the UE from performing unnecessary blind detection operation on the RS, thereby to reduce the power consumption of the UE.

BRIEF DESCRIPTION OF THE DRAWINGS

FIG. 1 is a schematic view showing an applicable network system according to one embodiment of the present disclosure;

FIG. 2 is a flow chart of an information indication method according to one embodiment of the present disclosure;

FIG. 3 is a flow chart of an information obtaining method according to one embodiment of the present disclosure;

DETAILED DESCRIPTION

Figure 4:
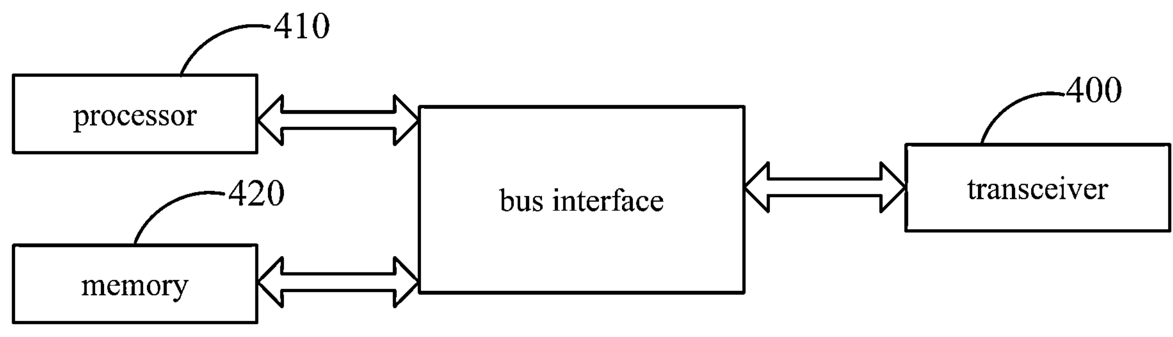
FIG. 4 is a block diagram of an information indication device according to one embodiment of the present disclosure.

Schemes in the embodiments of the present disclosure may be applied to various systems, especially a 5th-Generation (5G) mobile communication technology system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, or 5th-Generation (5G) New Radio (NR) system. Each of these systems includes a terminal device and a network device. Each system further includes a core network part, e.g., an Evolved Packet System (EPS) or 5G system (5GS/5GC).

FIG. 1 is a block diagram of an applicable wireless communication system according to one embodiment of the present disclosure. The wireless communication system includes a terminal 11 and a network device 12. The terminal 11 may also be called as a terminal device or a UE, and it may be a terminal side device such as a mobile phone, a tablet personal computer, a laptop computer or notebook computer, a Personal Digital Assistant (PDA), a pocket computer, a netbook, an Ultra-Mobile Personal Computer (UMPC), a Mobile Internet Device (MID), a wearable device, a Vehicle User Equipment (VUE), or a Pedestrian User Equipment (PUE). The wearable device includes a bracelet, an earphone or spectacles. It should be appreciated that, the specific type of the terminal 11 will not be particularly defined herein. The network device 12 may be a base station or a core network. The base station may be called as node B, evolved node B, access point, Base Transceiver Station (BTS), radio base station, radio transceiver, Basic Service Set (BSS), Extended service Set (ESS), home node B, evolved home node B, WLAN access point, WiFi node, Transmitting Reception Point (TRP) or any other appropriate term in the field. The base station shall not be limited to a specific technical term, as long as a same technical effect is achieved. It should be appreciated that, merely the base station in an NR system is taken as an example in the embodiments of the present disclosure, but a specific type of the base station will not be particularly defined herein.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

As shown in FIG. 2, the present disclosure provides in some embodiments an information indication method, which includes the following steps.

Step 201: configuring, by a network side device, a first transmission resource, the first transmission resource being a transmission resource corresponding to an RS.

To be specific, the network side device is a base station. The RS includes at least one of a Channel State Information Reference Signal (CSI-RS) or a Tracking Reference Signal (TRS).

Step 202: transmitting, by the network side device, first signaling, the first signaling being used to indicate resource information on the first transmission resource, the first signaling including at least one of high-layer signaling or layer1 signaling, and the resource information including at least one of whether there is the RS, or whether there is an update to the RS.

In this step, for a UE in an idle state or inactive state, the high-layer signaling mainly includes SI, an MIB and/or an SIB. The layer1 signaling includes PEI and/or DCI.

According to the embodiments of the present disclosure, the network side device configures the transmission resource corresponding to the RS, and indicates the resource information on the first transmission resource through the first signaling, e.g., whether there is the RS and/or whether there is an update to the RS. As a result, it is able for the UE in the idle state or inactive state to accurately obtain the resource information on the first transmission resource, and prevent the UE from performing unnecessary blind detection operation on the RS, thereby to reduce the power consumption of the UE.

In some possible embodiments of the present disclosure, the information indication method further includes explicitly or implicitly indicating, by the network side device, a signaling type of the first signaling through indication information, the indication information is carried through high-layer signaling, and the signaling type includes at least one of high-layer signaling or layer1 signaling.

Here, the high-layer signaling carrying the indication information is SI, and the SI includes at least one of an MIB, an SIB1, or an SIB for configuring the first transmission resource.

In some possible embodiments of the present disclosure, the explicitly or implicitly indicating, by the network side device, the signaling type of the first signaling includes transmitting, by the network side device, first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 (L1) signaling.

For example, the base station indicates, through SI, the UE to determine the resource information on the first transmission resource in accordance with the SIB or L1 signaling. In some possible embodiments of the present disclosure, the SI is an SIB for configuring an RS resource. One-bit indication, e.g., L1orSIBIndicationTRS, is carried in the SIB, and when L1orSIBIndicationTRS=1, it indicates the UE to determine the resource information on the first transmission resource in accordance with the L1 signaling, i.e., indicates the UE to activate the L1 signaling. The L1 signaling is carried through a downlink control channel. For example, the L1 signaling is a paging DCI reserved bits, or DCI-based PEI, or sequence-based PEI. When L1orSIBIndicationTRS=0, it indicates the UE to determine the resource information on the first transmission resource in accordance with the SIB, i.e., indicates the UE to deactivate the L1 signaling. Here, the resource information on the first transmission resource is determined in accordance with whether there is the SIB for configuring the RS in the SI received by the UE. When there is no SIB in the SI, it means that there is no RS on the first transmission resource, and when there is the SIB, it means that there is the RS on the first transmission resource.

In another possible embodiment of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

During the implementation, the network side device indicates the resource information on the first transmission resource through at least two bits, e.g., through two bits. For example, when L1IndicationTRS=01, it means that whether there is an update to the RS is indicated through the paging DCI; when L1IndicationTRS=11, it means that whether there is an uprate to the RS is indicated through the PEI; and when L1IndicationTRS=11, it means that whether there is an update to the RS is not indicated through the L1 signaling (which is equivalent to whether there is an update to the RS is indicated through the SIB).

In some possible embodiments of the present disclosure, the implicitly indicating, by the network side device, the signaling type of the first signaling through the indication information includes: in the case that first parameter information is carried in an SIB, indicating that the signaling type of the first signaling is layer1 signaling, otherwise indicating that the signaling type of the first signaling is high-layer signaling; or in the case that the first parameter information carried in the SIB is greater than or equal to a predetermined threshold, indicating that the signaling type of the first signaling is high-layer signaling, otherwise indicating that the signaling type of the first signaling is layer1 signaling.

In some possible embodiments of the present disclosure, the first parameter information is specifically a validation timer of the RS. When the validation timer is carried in the SIB, it implicitly indicates that the resource information on the first transmission resource is determined through the SIB, otherwise the resource information on the first transmission resource is determined through the SIB. The validation timer is configured through the SI, and it is used to indicate that, after the UE has obtained an existential indication indicating that there is the RS in accordance with the L1 signaling, especially after the UE has obtained an affirmative indication indicating that there is the RS on the first transmission resource, the affirmative indication continues to exist within a subsequent time period of the validation timer.

In another possible embodiment of the present disclosure, apart from the validation timer in the SIB, the base station also sets a predetermined value Th1 that is agreed with the UE. When a value of the validation timer is greater than or equal to Th1, it implicitly indicates that the UE needs to determine the resource information on the first transmission resource in accordance with the SIB; otherwise, the UE needs to determine the resource information on the first transmission resource in accordance with the L1 signaling. Optionally, the predetermined threshold corresponds to a correction period of the SI.

In the embodiments of the present disclosure, in a scenario whether the RS resource configured for the UE in a connected state changes frequently, whether there is the RS or there is an update to the RS is indicated through the L1 signaling. In this way, it is able to reduce the power consumption caused when the UE frequently reads an SIB message. In a scenario where the RS resource configured for the UE in the connected state changes slowly, whether there is the RS or there is an update to the RS is indicated through the SIB. In this way, it is able to prevent the base station from transmitting the always-on RS L1 signaling, thereby to reduce an overhead and the power consumption of the base station. In addition, it is able to prevent the UE from missing on the actually-transmitted RS in time when the L1 signaling is detected erroneously or the L1 signaling is not transmitted in time, thereby to reduce the power consumption of the UE.

Of course, similarly, the base station further indicates, through high-layer signaling, the UE to determine the resource information on the first transmission resource configured through the high-layer signaling in accordance with the PEI or the L1 signaling, so as to prevent the resource information from being indicated repeatedly through both the high-layer signaling and the L1 signaling.

In some possible embodiments of the present disclosure, the first signaling is high-layer signaling, the information indication method further includes configuring a search space corresponding to a first SIB and a monitoring cycle for the search space through SI, the monitoring cycle includes an actual monitoring cycle, and the first SIB is an SIB other than SIB1.

In some possible embodiments of the present disclosure, the configuring the monitoring cycle for the search space through the SI includes configuring the actual monitoring cycle through the first SIB.

In some possible embodiments of the present disclosure, the monitoring cycle further includes a nominal monitoring cycle. The configuring the nominal monitoring cycle through the SI includes configuring the nominal monitoring cycle through the SIB1.

Here, the base station indicates the resource information through the SI, and the UE obtains a semi-static resource information updating method in accordance with paging DCI SI update bits. In some possible embodiments of the present disclosure, the base station further adopts the following faster updating method, an updating speed of which is between a method using the SI and a method using the L1 signaling. Behaviors of the base station and the UE will be described as follows.

Behaviors of the base station: the base station configures a search space corresponding to SIB-X (an SIB other than SIB1, e.g., SIB2 or SIB3) as well as a nominal monitoring cycle T and an actual monitoring cycle (or parameters related to the actual monitoring cycle) for the search space through the SI, e.g., SIB1. More specifically, when the search space is configured through the high-layer signaling, a monitoring cycle T is inevitably configured in accordance with a relevant protocol. In the related art, when the SI changes or the UE has just accessed a cell, a Physical Downlink Control Channel (PDCCH) needs to be monitored in accordance with the cycle T so as to obtain scheduling information about SIB-X. In the embodiments of the present disclosure, the monitoring cycle T is a nominal monitoring cycle, and the actual monitoring cycle is a function of the nominal monitoring cycle T. For example, the base station configures a predetermined integer N, and the actual monitoring cycle of the UE is N*T. The parameter related to the actual monitoring cycle is also a function of a DRX cycle, e.g., the actual monitoring cycle is N*DRX cycle. In this regard, the behaviors of the UE are obviously different from those in the related art.

Behaviors of the UE: when the updating of the SI is not triggered through the paging DCI SI update bits, the UE monitors the search space corresponding to SIB-X in accordance with the actual monitoring cycle configured by the base station, e.g., N*T, where T is a monitoring cycle for the search space configured through the SI. Alternately, the UE monitoring the PDCCH corresponding to the SIB-X once or multiple times every N*DRX cycle. Here, when the PDCCH is monitored multiple times, the UE monitors the PDCCH in all search spaces configured by the base station within a to-be-monitored DRX cycle, and when the PDCCH is monitored once, the UE monitors one search space once with a PDCCH monitoring cycle granularity as N*DRX cycle. Optionally, when the updating of the SI has been triggered through the paging DCI SI update bits, the UE still monitors the search space corresponding to the SIB-X within the current SI updating cycle in accordance with the actual monitoring cycle configured by the base station, e.g., N*T.

In the related art, for the UE in the idle state or inactive state on which cell selection has been completed, after it has received the SI, it may receive an update system message within a next SI correction cycle only when the UE is notified through a paging DCI SI update field to receive the SI. Hence, the system message updating granularity is the SI correction cycle, which is 2, 4, 8 or 16 times of the DRX cycle, with a smaller updating speed. In the embodiments of the present disclosure, the UE monitors the search space corresponding to the SIB-X related to the CSI-RS/TRS configuration in accordance with the actual monitoring cycle configured by the base station, without any necessity to trigger the updating of the system message through the paging DCI SI update bits at first, or the UE monitors the SIB-X in accordance with the actual monitoring cycle configured by the base station no matter whether the updating of the system message has been triggered through the paging DCI SI update bits. As compared with the SI updating mechanism in the related art, it is able to obtain the resource information on the first transmission resource rapidly, and prevent the UE from decoding an SSB and/or the SIB1 frequently. In addition, a size of the actual monitoring cycle is configurable, e.g., the PDCCH is monitored once every N number of DRX cycles, so it is able to control the power consumption of the UE.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the information indication method further includes configuring, by the network side device, a maximum quantity of updates for the SIB through high-layer signaling.

In the embodiments of the present disclosure, the resource information on the first transmission resource is indicated jointly through the high-layer signaling and the layer1 signaling. To be specific, behaviors of the base station and the UE will be described hereinafter.

Behaviors of the base station: the base station indicates, through the L1 signaling, e.g., paging DCI reserved bits or PEI, that there is an update to the first SIB (SIB-X). More specifically, the L1 signaling is used to not only indicate the existence of the RS configured through the high-layer signaling, but also indicate an SIB-X update message or change message. The SIB-X update message is mainly used to indicate that the SIB-X is updated from a legacy version into a new version, but not limited to indicate whether the original SIB-X exists. Optionally, the SIB-X update message carried in the L1 signaling is SIB-X version information, e.g., SIB-X_version_Index, where SIB-X_version_Index=0, 1, 2, 3, 4. The SIB-X further includes the SIB-X version information, and the SIB-X version information is indicated by the base station in SIB1. A maximum quantity K of changes of the SIB-X within a system message updating cycle is agreed in a protocol, e.g., K=1 or 4, i.e., the SIB-X is updated for at most K times within the system message updating cycle. Optionally, the base station also configures the maximum quantity of changes of the SIB-X within a system message updating cycle through the SI.

Behaviors of the UE: the UE reads the SIB-X updating or directly deactivates the SIB-X in accordance with the paging DCI reserved bits within the SI updating cycle within which an indication indicating a change of the resource information has been received. Within a current SI updating cycle, no matter whether the updating of the SI is triggered by the base station through the paging DCI SI update bits, the UE monitors the SIB-X in accordance with a previously-obtained SI configuration, so as to obtain the SIB-X updating, or directly deactivates an original SIB-X configuration. An SIB-X updating indication carried in the L1 signaling includes the SIB-X version information SIB-X_version_Index, and the SIB-X also includes the version information. At this time, when the UE has received the updated SIB-X, the UE may not receive the SIB-X with this version again upon the receipt of the SIB-X version information in the L1 signaling. For a UE which has just accessed a cell, it directly receives the SIB-X, and determines whether the SIB-X needs to be updated in accordance with the SIB-X updating indication information in the L1 signaling.

As compared with the related art in which the updating of the system information is triggered through SI update bits carried in a short message field in the paging DCI, in the embodiments of the present disclosure, the SIB-X updating is triggered merely through the L1 signaling. The most noticeable advantage lies in that the L1 signaling is configured to indicate the resource information on the first transmission resource. In a scenario where the RS changes frequently, when the method in the related art is adopted, in the case that it is impossible to update the SIB, e.g., within an SI correction cycle, it is merely able for the base station to indicate the UE that all of, or a subset of, CSI-RSs/TRSs corresponding to a current CSI-RS/TRS resource are unavailable for the UE. Once the indicated CSI-RS/TRX is unavailable, it is impossible for the SIB-X to continue to provide any benefit to the power consumption saving of the UE. However, according to the method in the embodiments of the present disclosure, it is able to not only indicate currently-configured CSI-RS/TRS resources on which no CSI-RS is transmitted, but also update the SIB-X rapidly, thereby to provide more benefits to the power consumption saving of the UE.

In some possible embodiments of the present disclosure, the first signaling includes at least two pieces of layer1 signaling for indicating resource information on the first transmission resource within different time periods.

According to a first option, the first signaling includes PEI and paging DCI, the PEI is used to indicate resource information on the first transmission resource within a first cycle, the first cycle is a cycle within which the PEI has been configured, the paging DCI is used to indicate resource information on the first transmission resource within a second cycle, and the second cycle is a cycle within which no PEI has been configured yet.

During the implementation, when the PEI is configured by the base station within the first cycle, the base station indicates the resource information on the first transmission resource through the PEI, and the base station does not configure paging DCI reserved bits within the first cycle to indicate the resource information on the first transmission resource. For example, the first cycle represents a time period within which the PEI is configured by the base station for the UE. At this time, the base station does not configure the paging DCI reserved bits within the first cycle to indicate the resource information on the first transmission resource, and instead, it indicates the resource information merely through the PEI. When no PEI is configured by the base station within the second cycle, the base station indicates the resource information on the first transmission resource through the paging DCI reserved bits within the second cycle. For example, the second cycle represents a time period within which no PEI is configured by the base station for the UE. At this time, the base station configures the paging DCI reserved bits to indicate the resource information on the first transmission resource.

Behaviors of the UE: when the PEI is configured by the base station within the first cycle, the UE obtains the resource information on the first transmission resource only through the PEI. When no PEI is configured by the base station within the second cycle, the UE obtains the resource information on the first transmission resource through the paging DCI reserved bits.

In this way, it is able to prevent the resource information from being indicated through the PEI to the greatest extent, thereby to reduce the power consumption of the UE. This is because the paging DCI is not necessarily transmitted, and when the PEI is not configured, it is able to reduce the power consumption of the UE through the paging DCI reserved bits to a greatest extent.

According to a second option, the first signaling includes PEI and paging DCI, the PEI is used to indicate resource information on the first transmission resource within a first DRX cycle, the paging DCI is used to indicate resource information on the first transmission resource within a second DRX cycle, and the first DRX cycle is located before the second DRX cycle.

During the implementation, behaviors of the base station and the UE will be described hereinafter.

Behaviors of the base station: the base station configures that the resource information on the first transmission resource is indicated jointly through the PEI and the paging DCI reserved bits. The PEI is used to indicate the resource information on the first transmission resource within the first DRX cycle, and the paging DCI reserved bits are used to indicate the resource information on the first transmission resource within the second DRX cycle.

Behaviors of the UE: the UE obtains the resource information on the first transmission resource within the first DRX cycle in accordance with the PEI, and obtains the resource information on the first transmission resource within the second DRX cycle in accordance with the paging DCI. For example, the resource information within the first DRX cycle is different from the resource information within the second DRX cycle, e.g., they are transmitted through different transmission beams or occupy different bandwidths. In the embodiments of the present disclosure, it is able to provide the CSI-RS/TRS resource indication information to the UE flexibly through the PEI and the paging DCI reserved bit within different time periods, so as to reduce the power consumption of the UE, and reduce a signaling overhead of the base station.

In some possible embodiments of the present disclosure, the first signaling is layer1 signaling, the layer1 signaling includes PEI and paging DCI, the PEI is used to indicate first resource information on the first transmission resource, the paging DCI is used to indicate second resource information on the first transmission resource, and the first resource information is different from the second resource information.

In some possible embodiments of the present disclosure, the first resource information is used to indicate whether there is the RS, and the second resource information is used to indicate whether there is an update to the RS.

To be specific, the first resource information is used to indicate whether there is the RS, and the second resource information is information related to the RS, e.g., beam information.

Behaviors of the base station and the UE will be described hereinafter.

Behaviors of the base station: the base station configures that the resource information on the first transmission resource is indicated jointly through the PEI and the paging DCI, and the PEI is used to indicate the first resource information, e.g., at least one bit is used to indicate the existence of the RS. To be specific, 0 indicates that CSI-RSs/TRSs exist for all CSI-RS resources, 1 indicates that merely a first CSI-RS resource sub-set exists, 2 indicates that first two CSI-RS resource sub-sets exist, and 3 indicates that no CSI-RS/TRS exists for all the CSI-RS resources. The paging DCI reserved bits are used to indicate the second resource information. For example, a bitmap is configured to correspond to a smaller granularity of the RS, e.g., each bit in the bitmap corresponds to, or is associated with, a CSI-RS resource for at least one beam or one CSI-RS resource set. Alternatively, the PEI is used to indicate a CSI-RS/TRS resource set corresponding to a first beam set, and the paging DCI reserved bits are used to indicate a CSI-RS/TRS resource set corresponding to a second beam set. In some possible embodiments of the present disclosure, the CSI-RS/TRS resource set corresponding to the first beam set and the CSI-RS/TRS resource set corresponding to the second beam set are defined in the SIB-X respectively.

Behaviors of the UE: the UE obtains the first resource information indicating the existence of the CSI-RS/TRS in accordance with the PEI, and obtains the second resource information in accordance with the paging DCI reserved bits. In this way, it is able for the UE to reduce a capacity for indicating the existence of the CSI-RS/TRS in the PEI, e.g., reduce the quantity of types of existence of the CSI-RS/TRS in sequence-based PEI and reduce a size of a field for indicating the existence of the CSI-RS/TRS in DCI-based PEI, thereby to improve the PEI detection performance.

In some possible embodiments of the present disclosure, the first transmission resource includes M resource groups, the first resource information is resource information about a first part of resource groups in the M resource groups, and the second resource information is resource information about a second part of resource groups in the M resource groups.

In the embodiments of the present disclosure, the base station configures that the resource information on the first transmission resource is indicated jointly through the PEI and the paging DCI, the PEI is used to indicate the resource information about M1 resource groups, and the paging DCI is used to indicate the resource information about M2 resource groups, where M1+M2=M. The UE obtains the resource information about the M1 resource groups in accordance with the PEI, and obtains the resource information about the M2 resource groups in accordance with the paging DCI. In this way, it is able to prevent the resource information from occupying a large quantity of bits in the paging DCI or PEI. In some possible embodiments of the present disclosure, the first resource information is used to indicate whether there is the RS, the second resource information is used to indicate whether there is an update to the SIB, and the SIB is used to indicate whether is an update to the RS. Alternatively, the first resource information is used to indicate whether there is an update to the SIB, the second resource information is used to indicate whether there is the RS, and the SIB is used to indicate whether there is an update to the RS.

Behaviors of the base station and the UE will be described hereinafter.

Behaviors of the base station: the base station configures that the resource information on the first transmission resource is indicated jointly through the PEI and the paging DCI. The PEI is used to indicate whether there is an update to the RS or whether there is the RS, e.g., a bitmap is used to indicate whether there is a CSI-RS/TRS corresponding to a CSI-RS resource or whether there is an update to the CSI-RS/TRS, and bits in the bitmap correspond to different CSI-RS/TRS groups. The paging DCI reserved bits are used to indicate whether there is an update to the SIB-X, and the SIB-X is used to indicate whether there is an update to the RS or whether there is the RS. Alternatively, the PEI is used to indicate update indication information about an SIB-X, and the SIB-X is used to indicate whether there is an update to the RS or whether there is the RS. The paging DCI reserved bits, e.g., a bitmap, are used to indicate whether there is a CSI-RS/TRS corresponding to a CSI-RS resource or whether there is an update to the CSI-RS/TRS, e.g., bits in the bitmap correspond to different CSI-RS/TRS groups.

Behaviors of the UE: the UE obtains a rapid update indication for the SIB-X in accordance with the PEI or the paging DCI reserved bits. When the paging DCI indicates that the current SIB-X has been updated, the UE ignores the current PEI within a time period within which no update indication for the SIB-X is obtained.

In some possible embodiments of the present disclosure, the first signaling is layer1 signaling, and the transmitting, by the network side device, the first signaling includes transmitting, by the network side device, the first signaling in the case that there is paging information or a short message.

During the implementation, the base station indicates the resource information on the first transmission resource through the L1 signaling. When the paging DCI reserved bits are used to indicate the resource information, the base station does not transmit an indication for indicating that the paging DCI reserved bits are dedicated for the resource information when no paging information or short message is transmitted. In other words, the base station indicates the resource information through the paging DCI only when the paging information or short message is transmitted. More specifically, when a short messages indicator field in the paging DCI has a first predetermined value and/or a Frequency Domain Resource Assignment (FDRA) field in the paging DCI has a second predetermined value, the base station does not transmit the paging DCI for specially indicating the resource information. Optionally, the first predetermined value includes all-zero bits, and the second predetermined value includes all-one or all-zero bits.

In this regard, it is able to prevent a Rel-15 or Rel-16 UE from being erroneously waken up to receive a paging message in the case of the paging DCI reserved bits, thereby to prevent the reduction in the power consumption of a legacy UE from being adversely affected.

In some possible embodiments of the present disclosure, the information indication method further includes not indicating, by the network side device, that there is the RS on the first transmission resource through layer1 signaling any more in the case that the network side device has indicated through layer1 signaling that there is no RS on the first transmission resource and the SIB has not been updated.

During the implementation, the base station indicates the resource information on the first transmission resource through the L1 signaling. When the resource information indicates that there is no RS and the SIB-X (the first SIB) fails to be updated, the RS is not indicated as existing any more through the L1 signaling. The L1 signaling at least includes the paging DCI and the PEI.

In the embodiments of the present disclosure, the L1 signaling is used to indicate the resource information on the first transmission resource. Of course, after the RS is indicated as not existing, the RS may be allowed to be indicated as existing again. However, from the perspective of a high-layer protocol, once the RS is indicated as not existing, the RS configured through the SIB-X changes. When the SI is not updated, it should not be considered as that the SIB-X is re-configured.

According to the embodiments of the present disclosure, the network side device configures the transmission resource corresponding to the RS, and indicates the resource information on the first transmission resource through the first signaling, e.g., whether there is the RS and whether there is an update to the RS. As a result, it is able for a UE in an idle state or an inactive state to accurately obtain the resource information on the first transmission resource, and prevent the UE from performing unnecessary blind detection operation on the RS, thereby to reduce the power consumption of the UE.

As shown in FIG. 3, the present disclosure further provides in some embodiments an information obtaining method, which includes Step 301 of obtaining, by a UE, first signaling, the first signaling being used to indicate resource information on a first transmission resource, the first transmission resource being a transmission resource corresponding to an RS, the first signaling including at least one of high-layer signaling or layer1 signaling, and the resource information including at least one of whether there is the RS, or whether there is an update to the RS.

In this step, for a UE in an idle state or inactive state, the high-layer signaling mainly includes SI, an MIB and/or an SIB. The layer1 signaling includes PEI and/or DCI.

According to the embodiments of the present disclosure, the UE obtains the first signaling, and the first signaling is used to indicate the resource information on the first transmission resource, e.g., whether there is the RS, or whether there is an update to the RS. As a result, it is able for a UE in an idle state or an inactive state to accurately obtain the resource information on the first transmission resource, and prevent the UE from performing unnecessary blind detection operation on the RS, thereby to reduce the power consumption of the UE.

In some possible embodiments of the present disclosure, the information obtaining method further includes explicitly or implicitly obtaining, by the UE, a signaling type of the first signaling through indication information, the indication information is carried through high-layer signaling, and the signaling type includes at least one of high-layer signaling or layer1 signaling.

Here, the high-layer signaling carrying the indication information is SI, and the SI includes at least one of an MIB, an SIB1, or an SIB for configuring the first transmission resource.

In some possible embodiments of the present disclosure, the explicitly obtaining, by the UE, the signaling type of the first signaling through the indication information includes obtaining, by the UE, first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, the implicitly obtaining, by the UE, the signaling type of the first signaling through the indication information includes: in the case that first parameter information is carried in an SIB, determining that the signaling type of the first signaling is layer1 signaling, otherwise determining that the signaling type of the first signaling is high-layer signaling; or in the case that the first parameter information carried in the SIB is greater than or equal to a predetermined threshold, determining that the signaling type of the first signaling is high-layer signaling, otherwise determining that the signaling type of the first signaling is layer1 signaling.

In some possible embodiments of the present disclosure, the first signaling is high-layer signaling, the information obtaining method further includes obtaining a search space corresponding to a first SIB and a monitoring cycle for the search space through SI, the monitoring cycle includes an actual monitoring cycle, and the first SIB is an SIB other than SIB1.

In some possible embodiments of the present disclosure, the obtaining the monitoring cycle for the search space through the SI includes obtaining the actual monitoring cycle through the first SIB.

In some possible embodiments of the present disclosure, the information obtaining method further includes monitoring the search space corresponding to the first SIB in accordance with the actual monitoring cycle in the case that the updating of the SI is not triggered.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the information obtaining method further includes obtaining, by the UE, a maximum quantity of updates for the SIB through high-layer signaling.

In some possible embodiments of the present disclosure, the information obtaining method further includes updating the SIB or deactivating the SIB in accordance with the layer1 signaling within a current SI updating cycle.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the information obtaining method further includes determining, by the UE, resource information on the first transmission resource within a first cycle in accordance with the PEI and determining resource information on the first transmission resource within a second cycle in accordance with the paging DCI, the first cycle is a cycle within which the PEI has been configured, and the second cycle is a cycle within which no PEI has been configured yet.

In some possible embodiments of the present disclosure, the first signaling includes PEI and paging DCI, the information obtaining method further includes determining, by the UE, resource information on the first transmission resource within a first DRX cycle in accordance with the PEI and determining resource information on the first transmission resource within a second DRX cycle in accordance with the paging DCI, and the first DRX cycle is located before the second DRX cycle.

In some possible embodiments of the present disclosure, the first signaling is layer1 signaling, the layer1 signaling includes PEI and paging DCI, the information obtaining method further includes determining first resource information on the first transmission resource in accordance with the PEI and determining second resource information on the first transmission resource in accordance with the paging DCI, and the first resource information is different from the second resource information.

In some possible embodiments of the present disclosure, the first resource information is used to indicate whether there is an RS, and the second resource information is used to indicate whether there is an update to the RS.

In some possible embodiments of the present disclosure, the first transmission resource includes M resource groups, the first resource information is resource information about a first part of resource groups in the M resource groups, and the second resource information is resource information about a second part of resource groups in the M resource groups.

In some possible embodiments of the present disclosure, the first resource information is used to indicate whether there is an RS, the second resource information is used to indicate whether there is an update to an SIB, and the SIB is used to indicate whether there is an update to the RS.

In some possible embodiments of the present disclosure, the first resource information is used to indicate whether there is an update to an SIB, the second resource information is used to indicate whether there is an RS, and the SIB is used to indicate whether there is an update to the RS.

It should be appreciated that, the information obtaining method in the embodiments of the present disclosure corresponds to the above-mentioned information indication method, and a specific interaction process between the UE and the network side device has been described in detail in the embodiments involving the above-mentioned information indication method, which will not be particularly defined herein.

According to the embodiments of the present disclosure, the UE obtains the first signaling, and the first signaling is used to indicate the resource information on the first transmission resource, e.g., whether there is the RS, or whether there is an update to the RS. As a result, it is able for a UE in an idle state or an inactive state to accurately obtain the resource information on the first transmission resource, and prevent the UE from performing unnecessary blind detection operation on the RS, thereby to reduce the power consumption of the UE.

As shown in FIG. 4, the present disclosure further provides in some embodiments an information indication device for a network side device, which includes a memory 420, a transceiver 400 and a processor 410. The memory 420 is configured to store therein a computer program, and the transceiver 400 is configured to transmit and receive data under the control of the processor 410. The processor 410 is configured to read the computer program in the memory 420 so as to: configure a first transmission resource, the first transmission resource being a transmission resource corresponding to an RS; and transmit first signaling through the transceiver 400, the first signaling being used to indicate resource information on the first transmission resource, the first signaling including at least one of high-layer signaling or layer1 signaling, and the resource information including at least one of whether there is the RS, or whether there is an update to the RS.

In some possible embodiments of the present disclosure, the processor 410 is further configured to explicitly or implicitly indicate a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of an MIB, an SIB1, or an SIB for configuring the first transmission resource.

In some possible embodiments of the present disclosure, when explicitly or implicitly indicating the signaling type of the first signaling, the processor 410 is configured to transmit first indication information through the transceiver, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, when implicitly indicating the signaling type of the first signaling through the indication information, the processor 410 is configured to: in the case that first parameter information is carried in an SIB, indicate that the signaling type of the first signaling is layer1 signaling, otherwise indicate that the signaling type of the first signaling is high-layer signaling; or in the case that the first parameter information carried in the SIB is greater than or equal to a predetermined threshold, indicate that the signaling type of the first signaling is high-layer signaling, otherwise indicate that the signaling type of the first signaling is layer1 signaling.

In some possible embodiments of the present disclosure, the first signaling is high-layer signaling, and the processor 410 is further configured to configure a search space corresponding to a first SIB and a monitoring cycle for the search space through SI, the monitoring cycle includes an actual monitoring cycle, and the first SIB is an SIB other than SIB1.

In some possible embodiments of the present disclosure, when configuring the monitoring cycle for the search space through the SI, the processor 410 is configured to configure the actual monitoring cycle through the first SIB.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the processor 410 is further configured to configure a maximum quantity of updates for the SIB through high-layer signaling.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the PEI is used to indicate resource information on the first transmission resource within a first cycle, the first cycle is a cycle within which the PEI has been configured, the paging DCI is used to indicate resource information on the first transmission resource within a second cycle, and the second cycle is a cycle within which no PEI has been configured yet.

In some possible embodiments of the present disclosure, the first signaling includes PEI and paging DCI, the PEI is used to indicate resource information on the first transmission resource within a first DRX cycle, the paging DCI is used to indicate resource information on the first transmission resource within a second DRX cycle, and the first DRX cycle is located before the second DRX cycle.

In some possible embodiments of the present disclosure, the first signaling is layer1 signaling, the layer1 signaling includes PEI and paging DCI, the PEI is used to indicate first resource information on the first transmission resource, the paging DCI is used to indicate second resource information on the first transmission resource, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

In some possible embodiments of the present disclosure, the first signaling is layer1 signaling, and when transmitting the first signaling, the processor is configured to transmit the first signaling in the case that there is paging information or a short message.

In some possible embodiments of the present disclosure, the processor 410 is further configured to not indicate that there is the RS on the first transmission resource through layer1 signaling any more in the case that a network side device has indicated through layer1 signaling that there is no RS on the first transmission resource and the SIB has not been updated.

In FIG. 4, bus architecture may include a number of buses and bridges connected to each other, so as to connect various circuits for one or more processors 410 and one or more memories 420. In addition, as is known in the art, the bus architecture may be used to connect any other circuits, such as a circuit for a peripheral device, a circuit for a voltage stabilizer and a power management circuit. A bus interface may be provided, and the transceiver 400 may consist of a plurality of elements, i.e., a transmitter and a receiver for communication with any other devices over a transmission medium. The transmission medium includes a wireless channel, a wired channel, or an optical cable. The processor 410 may take charge of managing the bus architecture as well as general processings. The memory 420 may store therein data for the operation of the processor 410.

In some possible embodiments of the present disclosure, the processor 410 is a Central Processing Unit (CPU), an Application Specific Integrated Circuit (ASIC), a Field- Programmable Gate Array (FPGA) or a Complex Programmable Logic Device (CPLD). The processor may also use multi-core architecture.

It should be appreciated that, the device in the embodiments of the present disclosure is used to implement the above-mentioned information indication method with a same technical effect, which will not be particularly defined herein.

Figure 5:
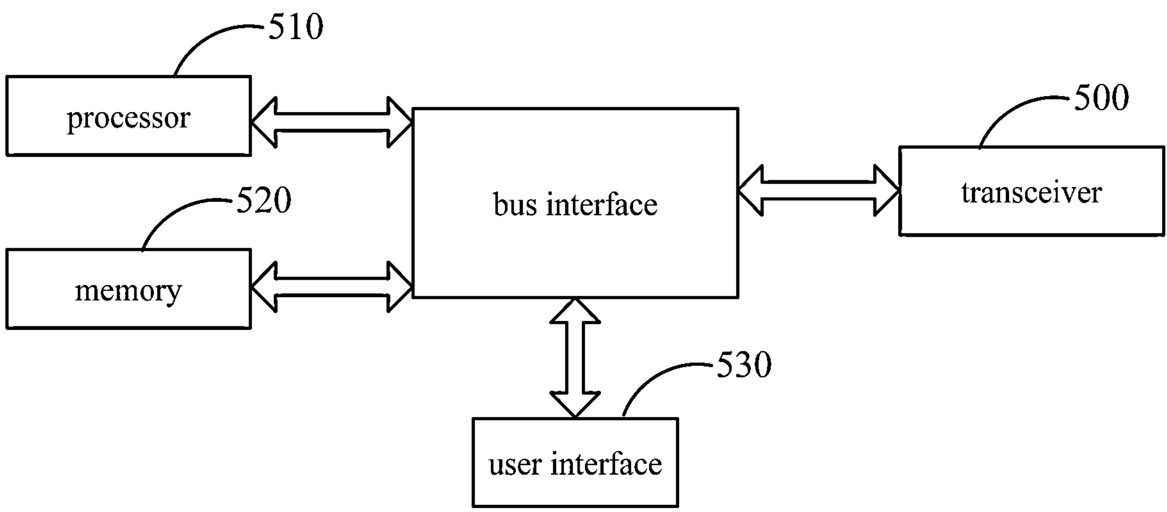
FIG. 5 is a block diagram of an information obtaining device according to one embodiment of the present disclosure.

As shown in FIG. 5, the present disclosure further provides in some embodiments an information obtaining device, which includes a memory 520, a transceiver 500 and a processor 510. The memory 520 is configured to store therein a computer program, and the transceiver 500 is configured to transmit and receive data under the control of the processor 510. The processor 510 is configured to read the computer program in the memory 520 so as to obtain first signaling through the transceiver 500, the first signaling is used to indicate resource information on a first transmission resource, the first transmission resource is a transmission resource corresponding to an RS, the first signaling includes at least one of high-layer signaling or layer1 signaling, and the resource information includes at least one of whether there is the RS, or whether there is an update to the RS.

In FIG. 5, bus architecture may include a number of buses and bridges connected to each other, so as to connect various circuits for one or more processors 510 and one or more memories 520. In addition, as is known in the art, the bus architecture may be used to connect any other circuits, such as a circuit for a peripheral device, a circuit for a voltage stabilizer and a power management circuit. A bus interface may be provided, and the transceiver 500 may consist of a plurality of elements, i.e., a transmitter and a receiver for communication with any other devices over a transmission medium. The transmission medium includes a wireless channel, a wired channel, or an optical cable. With respect to different UEs, a user interface 530 may also be provided for devices which are to be arranged inside or outside the UE, and these devices may include but not limited to a keypad, a display, a speaker, a microphone and a joystick. The processor 510 may take charge of managing the bus architecture as well as general processings. The memory 520 may store therein data for the operation of the processor 510.

In some possible embodiments of the present disclosure, the processor 510 is a CPU, an ASIC, an FPGA or a CPLD. The processor may also use multi-core architecture.

The processor is configured to call the computer program in the memory, so as to implement the above-mentioned method in accordance with obtained executable instructions. The processor may also be physically separated from the memory.

In some possible embodiments of the present disclosure, the processor 510 is further configured to explicitly or implicitly obtain a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of an MIB, an SIB1, or an SIB for configuring the first transmission resource.

In some possible embodiments of the present disclosure, when explicitly obtaining the signaling type of the first signaling through the indication information, the processor 510 is configured to obtain first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, when implicitly obtaining the signaling type of the first signaling through the indication information, the processor 510 is configured to: in the case that first parameter information is carried in an SIB, determine that the signaling type of the first signaling is layer1 signaling, otherwise determine that the signaling type of the first signaling is high-layer signaling; or in the case that the first parameter information carried in the SIB is greater than or equal to a predetermined threshold, determine that the signaling type of the first signaling is high-layer signaling, otherwise determine that the signaling type of the first signaling is layer1 signaling.

In some possible embodiments of the present disclosure, the first signaling is high-layer signaling, the processor 510 is further configured to obtain a search space corresponding to a first SIB and a monitoring cycle for the search space through SI, the monitoring cycle includes an actual monitoring cycle, and the first SIB is an SIB other than SIB1.

In some possible embodiments of the present disclosure, when obtaining the monitoring cycle for the search space through the SI, the processor 510 is configured to obtain the actual monitoring cycle through the first SIB.

In some possible embodiments of the present disclosure, the processor 510 is further configured to monitor the search space corresponding to the first SIB in accordance with the actual monitoring cycle in the case that the updating of the SI is not triggered.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the processor 510 is further configured to obtain a maximum quantity of updates for the SIB through high-layer signaling.

In some possible embodiments of the present disclosure, the processor 510 is further configured to update the SIB or deactivate the SIB in accordance with the layer1 signaling within a current SI updating cycle.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the processor 510 is further configured to determine resource information on the first transmission resource within a first cycle in accordance with the PEI and determine resource information on the first transmission resource within a second cycle in accordance with the paging DCI, the first cycle is a cycle within which the PEI has been configured, and the second cycle is a cycle within which no PEI has been configured yet.

In some possible embodiments of the present disclosure, the first signaling includes PEI and paging DCI, the processor 510 is further configured to determine resource information on the first transmission resource within a first DRX cycle in accordance with the PEI and determine resource information on the first transmission resource within a second DRX cycle in accordance with the paging DCI, and the first DRX cycle is located before the second DRX cycle.

In some possible embodiments of the present disclosure, the first signaling is layer1 signaling, the layer1 signaling includes PEI and paging DCI, the processor 510 is further configured to determine first resource information on the first transmission resource in accordance with the PEI and determine second resource information on the second transmission resource in accordance with the paging DCI, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

It should be appreciated that, the device in the embodiments of the present disclosure is used to implement the above-mentioned information obtaining method with a same technical effect, which will not be particularly defined herein.

Figure 6:
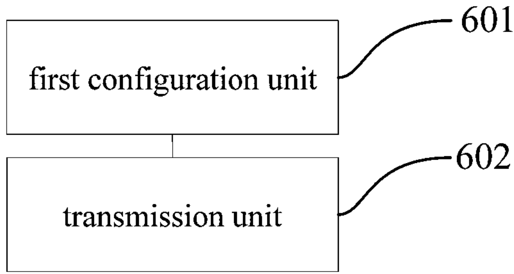
FIG. 6 is a schematic view showing the information indication device according to one embodiment of the present disclosure.

As shown in FIG. 6, the present disclosure further provides in some embodiments an information indication device, which includes: a first configuration unit 601 configured to configure a first transmission resource, the first transmission resource being a transmission resource corresponding to an RS; and a transmission unit 602 configured to transmit first signaling, the first signaling being used to indicate resource information on the first transmission resource, the first signaling including at least one of high-layer signaling or layer1 signaling, and the resource information including at least one of whether there is the RS, or whether there is an update to the RS.

In some possible embodiments of the present disclosure, the information indication device further includes a first indication unit configured to explicitly or implicitly indicate a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of an MIB, an SIB1, or an SIB for configuring the first transmission resource.

In some possible embodiments of the present disclosure, the first indication unit is configured to transmit first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, the first indication unit is configured to: in the case that first parameter information is carried in an SIB, indicate that the signaling type of the first signaling is layer1 signaling, otherwise indicate that the signaling type of the first signaling is high-layer signaling; or in the case that the first parameter information carried in the SIB is greater than or equal to a predetermined threshold, indicate that the signaling type of the first signaling is high-layer signaling, otherwise indicate that the signaling type of the first signaling is layer1 signaling.

In some possible embodiments of the present disclosure, the first signaling is high-layer signaling, and the information indication device further includes a second configuration unit configured to configure a search space corresponding to a first SIB and a monitoring cycle for the search space through SI, the monitoring cycle includes an actual monitoring cycle, and the first SIB is an SIB other than SIB1.

In some possible embodiments of the present disclosure, the second configuration unit is configured to configure the actual monitoring cycle through the first SIB.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the information indication device further includes a third configuration unit configured to configure a maximum quantity of updates for the SIB through high-layer signaling.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the PEI is used to indicate resource information on the first transmission resource within a first cycle, the first cycle is a cycle within which the PEI has been configured, the paging DCI is used to indicate resource information on the first transmission resource within a second cycle, and the second cycle is a cycle within which no PEI has been configured yet.

In some possible embodiments of the present disclosure, the first signaling includes PEI and paging DCI, the PEI is used to indicate resource information on the first transmission resource within a first DRX cycle, the paging DCI is used to indicate resource information on the first transmission resource within a second DRX cycle, and the first DRX cycle is located before the second DRX cycle.

In some possible embodiments of the present disclosure, the first signaling is layer1 signaling, the layer1 signaling includes PEI and paging DCI, the PEI is used to indicate first resource information on the first transmission resource, the paging DCI is used to indicate second resource information on the first transmission resource, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

In some possible embodiments of the present disclosure, the first signaling is layer1 signaling, and the transmission unit is configured to transmit the first signaling in the case that there is paging information or a short message.

In some possible embodiments of the present disclosure, the information indication device further includes a first processing unit configured to not indicate that there is the RS on the first transmission resource through layer1 signaling any more in the case that a network side device has indicated through layer1 signaling that there is no RS on the first transmission resource and the SIB has not been updated.

It should be appreciated that, the device in the embodiments of the present disclosure is used to implement the above-mentioned information indication method with a same technical effect, which will not be particularly defined herein.

Figure 7:
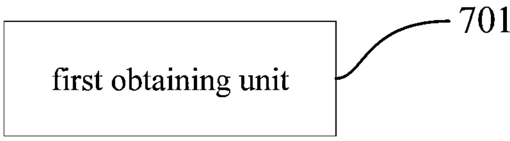
FIG. 7 is a schematic view showing the information obtaining device according to one embodiment of the present disclosure.

As shown in FIG. 7, the present disclosure further provides in some embodiments an information obtaining device, which includes a first obtaining unit 701 configured to obtain first signaling, the first signaling being used to indicate resource information on a first transmission resource, the first transmission resource being a transmission resource corresponding to an RS, the first signaling including at least one of high-layer signaling or layer1 signaling, and the resource information including at least one of whether there is the RS, or whether there is an update to the RS.

In some possible embodiments of the present disclosure, the information obtaining device further includes a second obtaining unit configured to explicitly or implicitly obtain a signaling type of the first signaling through indication information, the indication information is carried through high-layer signaling, and the signaling type includes at least one of high-layer signaling or layer1 signaling.

In some possible embodiments of the present disclosure, the high-layer signaling is system information, and the system information includes at least one of an MIB, an SIB1, or an SIB for configuring the first transmission resource.

In some possible embodiments of the present disclosure, the second obtaining unit is configured to obtain first indication information, and the first indication information is used to indicate the signaling type of the first signaling.

In some possible embodiments of the present disclosure, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling.

In some possible embodiments of the present disclosure, the first indication information includes N bits, where N is greater than or equal to 2. In the case that the first indication information is third predetermined information, the first indication information is used to indicate that the signaling type of the first signaling is paging DCI in layer1 signaling; or in the case that the first indication information is fourth predetermined information, the first indication information is used to indicate that the signaling type of the first signaling is PEI in layer1 signaling; or in the case that the first indication information is fifth predetermined information, the first indication information is used to indicate that the signaling type of the first signaling is high-layer signaling.

In some possible embodiments of the present disclosure, the second obtaining unit is configured to: in the case that first parameter information is carried in an SIB, determine that the signaling type of the first signaling is layer1 signaling, otherwise determine that the signaling type of the first signaling is high-layer signaling; or in the case that the first parameter information carried in the SIB is greater than or equal to a predetermined threshold, determine that the signaling type of the first signaling is high-layer signaling, otherwise determine that the signaling type of the first signaling is layer1 signaling.

In some possible embodiments of the present disclosure, the first signaling is high-layer signaling, and the information obtaining device further includes a third obtaining unit configured to obtain a search space corresponding to a first SIB and a monitoring cycle for the search space through SI, the monitoring cycle includes an actual monitoring cycle, and the first SIB is an SIB other than SIB1.

In some possible embodiments of the present disclosure, the third obtaining unit is configured to obtain the actual monitoring cycle through the first SIB.

In some possible embodiments of the present disclosure, the information obtaining unit further includes a monitoring unit configured to monitor the search space corresponding to the first SIB in accordance with the actual monitoring cycle in the case that the updating of the SI is not triggered.

In some possible embodiments of the present disclosure, the first signaling includes high-layer signaling and layer1 signaling, the high-layer signaling is an SIB, the SIB is used to indicate resource information on the first transmission resource, and the layer1 signaling is used to indicate whether there is an update to the SIB.

In some possible embodiments of the present disclosure, the layer1 signaling carries SIB version information, and the SIB carries SIB version information. In the case that the SIB version information carried in the layer1 signaling is different from the SIB version information carried in the SIB, the layer1 signaling is used to indicate that there is an update to the SIB, or in the case that the SIB version information carried in the layer1 signaling is same as the SIB version information carried in the SIB, the layer1 signaling is used to indicate that there is no update to the SIB.

In some possible embodiments of the present disclosure, the information obtaining device further includes a fourth obtaining unit configured to obtain a maximum quantity of updates for the SIB through high-layer signaling.

In some possible embodiments of the present disclosure, the information obtaining device further includes a second processing unit configured to update the SIB or deactivate the SIB in accordance with the layer1 signaling within a current SI updating cycle.

In some possible embodiments of the present disclosure, the first signaling includes at least two pieces of layer1 signaling for indicating resource information on the first transmission resource within different time periods.

In some possible embodiments of the present disclosure, the first signaling includes PEI and paging DCI, the information obtaining device further includes a first determination unit configured to determine resource information on the first transmission resource within a first cycle in accordance with the PEI and determine resource information on the first transmission resource within a second cycle in accordance with the paging DCI, the first cycle is a cycle within which the PEI has been configured, and the second cycle is a cycle within which no PEI has been configured yet.

In some possible embodiments of the present disclosure, the first signaling includes PEI and paging DCI, the information obtaining device further includes a second determination unit configured to determine resource information on the first transmission resource within a first DRX cycle in accordance with the PEI and determine resource information on the first transmission resource within a second DRX cycle in accordance with the paging DCI, and the first DRX cycle is located before the second DRX cycle.

In some possible embodiments of the present disclosure, the first signaling is layer1 signaling, the layer1 signaling includes PEI and paging DCI, the information obtaining device further includes a third determination unit configured to determine first resource information on the first transmission resource in accordance with the PEI and determine second resource information on the second transmission resource in accordance with the paging DCI, and the first resource information is different from the second resource information.

In some possible embodiments of the present disclosure, the first resource information is used to indicate whether there is an RS, and the second resource information is used to indicate whether there is an update to the RS; or the first transmission resource includes M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

It should be appreciated that, the device in the embodiments of the present disclosure is used to implement the above-mentioned information obtaining method with a same technical effect, which will not be particularly defined herein.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The present disclosure further provides in some embodiments a processor-readable storage medium storing therein a program instruction. The program instruction is executed by a processor, so as to: configure a first transmission resource, the first transmission resource being a transmission resource corresponding to an RS; and transmit first signaling, the first signaling being used to indicate resource information on the first transmission resource, the first signaling including at least one of high-layer signaling or layer1 signaling, and the resource information including at least one of whether there is the RS, or whether there is an update to the RS; or the program instruction is executed by a processor, so as to obtain first signaling, first signaling, the first signaling being used to indicate resource information on a first transmission resource, the first transmission resource being a transmission resource corresponding to an RS, the first signaling including at least one of high-layer signaling or layer signaling, and the resource information including at least one of whether there is the RS, or whether there is an update to the RS.

The program instruction is executed by the processor so as to implement the above-mentioned information indication method or the above-mentioned information obtaining method, which will not be particularly defined herein.

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be particularly defined herein.

The network device involved in the embodiments of the present disclosure may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present disclosure is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a Home evolved Node B (HeNB), a relay node, a femto, or a pico, which will not be particularly defined herein. In some network structures, the network device includes a Centralized Unit (CU) and a Distributed Unit (DU), which may be geographically separated from each other.

Multi Input Multi Output (MIMO) transmission is performed between the network side device and the terminal each with one or more antennae, and the MIMO transmission is Single User MIMO (SU-MIMO) or Multiple User MIMO (MU-MIMO). Depending on the form of an antenna combination and the quantity of antennae, the MIMO transmission may be 2D-MIMO, 3D-MIMO, FD-MIMO or massive-MIMO, and it may also be diversity transmission, precoding transmission or beam-forming transmission.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as “first” and “second” involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as “include” or “including” or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression “and/or” in the description and the appended claims is merely used to represent at least one of the objects before and after the expression. For example, “A and/or B and/or C” represents seven situations, i.e., there is only A, there is only B, there is only C, there are both A and B, there are both B and C, there are both A and C, and there are A, B and C. Similarly, the phrase “at least one of A or B” in the specification and the appended claims shall be understood as “there is only A, there is only B, or there are both A and B”.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information indication method, comprising:

configuring, by a network side device, a first transmission resource, the first transmission resource being a transmission resource corresponding to a Reference Signal (RS); and transmitting, by the network side device, first signaling, the first signaling being used to indicate resource information on the first transmission resource, the first signaling comprising at least one of high-layer signaling or layer1 signaling, and the resource information comprising at least one of whether there is RS transmission on one or more configured CSI-RS resources, or whether there is an update to the RS, wherein the first signaling comprises at least two different layer1 signaling for indicating resource information on the first transmission resource within different time periods.

2. The information indication method according to claim 1, wherein the information indication method realizes resource information indication by means of at least one of modes:

mode 1, the information indication method further comprising explicitly or implicitly indicating, by the network side device, a signaling type of the first signaling through indication information, wherein the indication information is carried through high-layer signaling, and the signaling type comprises at least one of high-layer signaling or layer1 signaling; or mode 2, wherein the implicitly indicating, by the network side device, the signaling type of the first signaling through the indication information comprises: in the case that first parameter information is carried in an SIB, indicating that the signaling type of the first signaling is layer1 signaling, otherwise indicating that the signaling type of the first signaling is high-layer signaling; or in the case that the first parameter information carried in the SIB is greater than or equal to a predetermined threshold, indicating that the signaling type of the first signaling is high-layer signaling, otherwise indicating that the signaling type of the first signaling is layer1 signaling; or mode 3, wherein the first signaling is high-layer signaling, and the information indication method further comprises configuring a search space corresponding to a first SIB and a monitoring cycle for the search space through SI, the monitoring cycle comprises an actual monitoring cycle, and the first SIB is an SIB other than SIB1; or mode 4, wherein the first signaling comprises high-layer signaling and layer1 signaling, the high-layer signaling is an SIB, the SIB is used to indicate resource information on the first transmission resource, and the layer1 signaling is used to indicate whether there is an update to the SIB; or mode 5, wherein the first signaling is layer1 signaling, the layer1 signaling comprises PEI and paging DCI, the PEI is used to indicate first resource information on the first transmission resource, the paging DCI is used to indicate second resource information on the first transmission resource, and the first resource information is different from the second resource information; or mode 6, the information indication method further comprising: not indicating, by the network side device, that there is the RS on the first transmission resource through layer1 signaling any more in the case that the network side device has indicated through layer1 signaling that there is no RS on the first transmission resource and the SIB has not been updated.

3. The information indication method according to claim 2, wherein in mode 1, the high-layer signaling is system information, and the system information comprises at least one of a Master Information Block (MIB), a System Information Block (SIB1), or an SIB for configuring the first transmission resource; or wherein in mode 1, the explicitly indicating, by the network side device, the signaling type of the first signaling comprises transmitting, by the network side device, first indication information, and the first indication information is used to indicate the signaling type of the first signaling.

4. The information indication method according to claim 2, wherein in mode 3, the configuring the monitoring cycle for the search space through the SI comprises configuring the actual monitoring cycle through the first SIB.

5. The information indication method according to claim 3, wherein in mode 1, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling; or wherein in mode 1, the first indication information comprises N bits, where N is greater than or equal to 2, wherein in the case that the first indication information is third predetermined information, the first indication information is used to indicate that the signaling type of the first signaling is paging Downlink Control Information (DCI) in layer1 signaling; or in the case that the first indication information is fourth predetermined information, the first indication information is used to indicate that the signaling type of the first signaling is Paging Early Indication (PEI) in layer1 signaling; or in the case that the first indication information is fifth predetermined information, the first indication information is used to indicate that the signaling type of the first signaling is high-layer signaling.

6. The information indication method according to claim 1, wherein the first signaling comprises PEI and paging DCI; the PEI is used to indicate resource information on the first transmission resource within a first cycle, the first cycle is a cycle within which the PEI has been configured; the paging DCI is used to indicate resource information on the first transmission resource within a second cycle, and the second cycle is a cycle within which no PEI has been configured yet; or wherein the first signaling comprises PEI and paging DCI; the PEI is used to indicate resource information on the first transmission resource within a first Discontinuous Reception (DRX) cycle; the paging DCI is used to indicate resource information on the first transmission resource within a second DRX cycle, and the first DRX cycle is located before the second DRX cycle.

7. The information indication method according to claim 2, wherein in mode 5, the first resource information is used to indicate whether there is an RS, and the second resource information is used to indicate whether there is an update to the RS; or the first transmission resource comprises M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

8. The information indication method according to claim 1, wherein the first signaling is layer1 signaling, and the transmitting, by the network side device, the first signaling comprises transmitting, by the network side device, the first signaling in the case that there is paging information or a short message.

9. An information obtaining method, comprising:

obtaining, by a User Equipment (UE), first signaling, the first signaling being used to indicate resource information on a first transmission resource, the first transmission resource being a transmission resource corresponding to a Reference Signal (RS), the first signaling comprising at least one of high-layer signaling or layer1 signaling, and the resource information comprising at least one of whether there is RS transmission on one or more configured CSI-RS resources, or whether there is an update to the RS, wherein the first signaling comprises at least two different layer1 signaling for indicating resource information on the first transmission resource within different time periods.

10. The information obtaining method according to claim 9, wherein the information obtaining method realizes resource information indication by means of at least one of modes:

mode 7, the information obtaining method further comprising explicitly or implicitly obtaining, by the UE, a signaling type of the first signaling through indication information, wherein the indication information is carried through high-layer signaling, and the signaling type comprises at least one of high-layer signaling or layer1 signaling; or mode 8, wherein the implicitly obtaining, by the UE, the signaling type of the first signaling through the indication information comprises: in the case that first parameter information is carried in an SIB, determining that the signaling type of the first signaling is layer1 signaling, otherwise determining that the signaling type of the first signaling is high-layer signaling; or in the case that the first parameter information carried in the SIB is greater than or equal to a predetermined threshold, determining that the signaling type of the first signaling is high-layer signaling, otherwise determining that the signaling type of the first signaling is layer1 signaling; or mode 9, wherein the first signaling is high-layer signaling, the information obtaining method further comprises obtaining a search space corresponding to a first SIB and a monitoring cycle for the search space through SI, the monitoring cycle comprises an actual monitoring cycle, and the first SIB is an SIB other than SIB1; or mode 10, wherein the first signaling comprises high-layer signaling and layer1 signaling, the high-layer signaling is an SIB, the SIB is used to indicate resource information on the first transmission resource, and the layer1 signaling is used to indicate whether there is an update to the SIB; or mode 11, wherein the first signaling is layer1 signaling, the layer1 signaling comprises PEI and paging DCI, the information obtaining method further comprises: determining first resource information on the first transmission resource in accordance with the PEI and determining second resource information on the first transmission resource in accordance with the paging DCI, and the first resource information is different from the second resource information.

11. The information obtaining method according to claim 10, wherein in mode 7, the high-layer signaling is system information, and the system information comprises at least one of a Master Information Block (MIB), a System Information Block (SIB1), or an SIB for configuring the first transmission resource, wherein the explicitly obtaining, by the UE, the signaling type of the first signaling through the indication information comprises obtaining, by the UE, first indication information, and the first indication information is used to indicate the signaling type of the first signaling.

12. The information obtaining method according to claim 11, wherein in mode 7, in the case that the first indication information is first predetermined information, the first indication information is used to indicate that the signaling type of the first signaling is high-layer signaling or indicate that layer1 signaling is to be deactivated; or in the case that the first indication information is second predetermined information, the first indication information is used to indicate that the signaling type of the first signaling is layer1 signaling; or wherein in mode 7, the first indication information comprises N bits, where N is greater than or equal to 2, wherein in the case that the first indication information is third predetermined information, the first indication information is used to indicate that the signaling type of the first signaling is paging Downlink Control Information (DCI) in layer1 signaling; or in the case that the first indication information is fourth predetermined information, the first indication information is used to indicate that the signaling type of the first signaling is Paging Early Indication (PEI) in layer1 signaling; or in the case that the first indication information is fifth predetermined information, the first indication information is used to indicate that the signaling type of the first signaling is high-layer signaling.

13. The information obtaining method according to claim 10, wherein in mode 9, the obtaining the monitoring cycle for the search space through the SI comprises obtaining the actual monitoring cycle through the first SIB; or wherein in mode 9, the information obtaining method further comprising monitoring the search space corresponding to the first SIB in accordance with the actual monitoring cycle in the case that the updating of the SI is not triggered.

14. The information obtaining method according to claim 10, wherein in mode 10, the information obtaining method further comprising:

obtaining, by the UE, a maximum quantity of updates for the SIB through high-layer signaling; or updating the SIB or deactivating the SIB in accordance with the layer1 signaling within a current SI updating cycle.

15. The information obtaining method according to claim 10, wherein in mode 11, the first resource information is used to indicate whether there is an RS, and the second resource information is used to indicate whether there is an update to the RS; or the first transmission resource comprises M resource groups, the first resource information is resource information about a first part of resource groups in the M resource groups, and the second resource information is resource information about a second part of resource groups in the M resource groups; or the first resource information is used to indicate whether there is an RS, the second resource information is used to indicate whether there is an update to an SIB, and the SIB is used to indicate whether there is an update to the RS; or the first resource information is used to indicate whether there is an update to an SIB, the second resource information is used to indicate whether there is an RS, and the SIB is used to indicate whether there is an update to the RS.

16. The information obtaining method according to claim 9, wherein the first signaling comprises PEI and paging DCI, the information obtaining method further comprises:

determining, by the UE, resource information on the first transmission resource within a first cycle in accordance with the PEI and determining resource information on the first transmission resource within a second cycle in accordance with the paging DCI, the first cycle is a cycle within which the PEI has been configured, and the second cycle is a cycle within which no PEI has been configured yet; or wherein the first signaling comprises PEI and paging DCI, the information obtaining method further comprises:

determining, by the UE, resource information on the first transmission resource within a first Discontinuous Reception (DRX) cycle in accordance with the PEI and determining resource information on the first transmission resource within a second DRX cycle in accordance with the paging DCI, and the first DRX cycle is located before the second DRX cycle.

17. An information obtaining device, comprising a memory, a transceiver and a processor, wherein the memory is configured to store therein a computer program, and the transceiver is configured to transmit and receive data under the control of the processor, wherein the processor is configured to read the computer program in the memory so as to realize the information obtaining method according to claim 9.

18. An information indication device, comprising a memory, a transceiver and a processor, wherein the memory is configured to store therein a computer program, and the transceiver is configured to transmit and receive data under the control of the processor, wherein the processor is configured to read the computer program in the memory so as to:

configure a first transmission resource, the first transmission resource being a transmission resource corresponding to a Reference Signal (RS); and transmit first signaling through the transceiver, the first signaling being used to indicate resource information on the first transmission resource, the first signaling comprising at least one of high-layer signaling or layer1 signaling, and the resource information comprising at least one of whether there is RS transmission on one or more configured CSI-RS resources, or whether there is an update to the RS, wherein the first signaling comprises at least two different layer1 signaling for indicating resource information on the first transmission resource within different time periods.

* * * * *